United States Patent [19]
Morlock et al.

[11] 3,741,992

[45] June 26, 1973

[54] DERIVATIVES OF 4A, 9B-DIHYDRO-8,9B-DIMETHYL-DIBENZOFURAN-3(4H)-ONE

[75] Inventors: Elizabeth Benz Morlock, St. CLair Shores, Mich.; Jay Donald Albright; Goldman Leon, both of Nanuet, N.Y.

[73] Assignee: American Cyanamid Company, Stamford, Conn.

[22] Filed: Nov. 23, 1971

[21] Appl. No.: 201,575

Related U.S. Application Data

[62] Division of Ser. No. 34,519, May 4, 1970, Pat. No. 3,646,060.

[52] U.S. Cl. .................................... 260/346.2 M

[51] Int. Cl. ............................................ C07d 5/34
[58] Field of Search ........................... 260/346.2 M

[56] References Cited
OTHER PUBLICATIONS

Arkley et al., Chem. Abstracts (1957) Vol. 51, 2717b.

*Primary Examiner*—Alex Mazel
*Assistant Examiner*—Beranrd Dentz
*Attorney*—Edward A. Conroy, Jr.

[57] ABSTRACT

This disclosure describes derivatives of 4a,9b-dihdro-8,9b-dimethyldibenzofuran and of 4a,9b-dihydro-8,9b-dimethyldibenzofuran-3(4H)-one useful as intermediates or as analgetic agents.

3 Claims, No Drawings

DERIVATIVES OF 4A, 9B-DIHYDRO-8,9B-DIMETHYL-DIBENZOFURAN-3(4H)-ONE

CROSS REFERENCE TO RELATED APPLICATION

This application is a division of our copending application Ser. No. 34,519, filed May 4, 1970 now U.S. Pat. 3,646,060.

BRIEF SUMMARY OF THE INVENTION

This invention relates to novel derivatives of 4a,9b--dihydro-8,9b-dimethyldibenzofuran and of 4a,9b-dihydro-8,9b--dimethyldibenzofurano-3(4H)-one and to methods of preparing these compounds. The novel compounds of the present invention may be represented by the following general formulae:

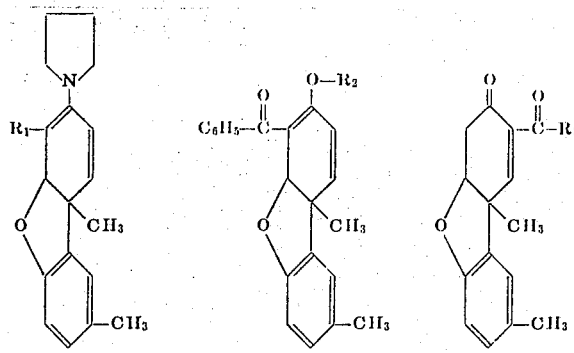

wherein $R_1$ is hydrogen, benzoyl or phenylcarbamoyl; $R_2$ is hydrogen or o-bromobenzoyl; and $R_3$ is phenyl or anilino.

DETAILED DESCRIPTION OF THE INVENTION

The novel compounds of the present invention are, in general, colorless or yellow crystalline solids with characteristic melting points and spectral properties. They are soluble in such common organic solvents as lower alkanols, benzene, chloroform, methylene dichloride, N,N-dimethylformamide and di-methyl sulfoxide. They are, however, generally insoluble in water.

The novel compounds of the present invention may be readily prepared from 4a,9b-dihydro-8,9b-dimethyl-dibenzofuran-3(4H)-one [Pummerer et al., Ber. 55, 3116 (1922); Arkley et al., J. Chem. Soc., 2322 (1956)] in accordance with the following reaction scheme:

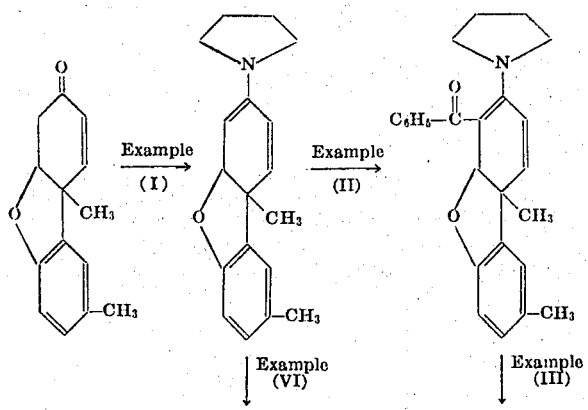

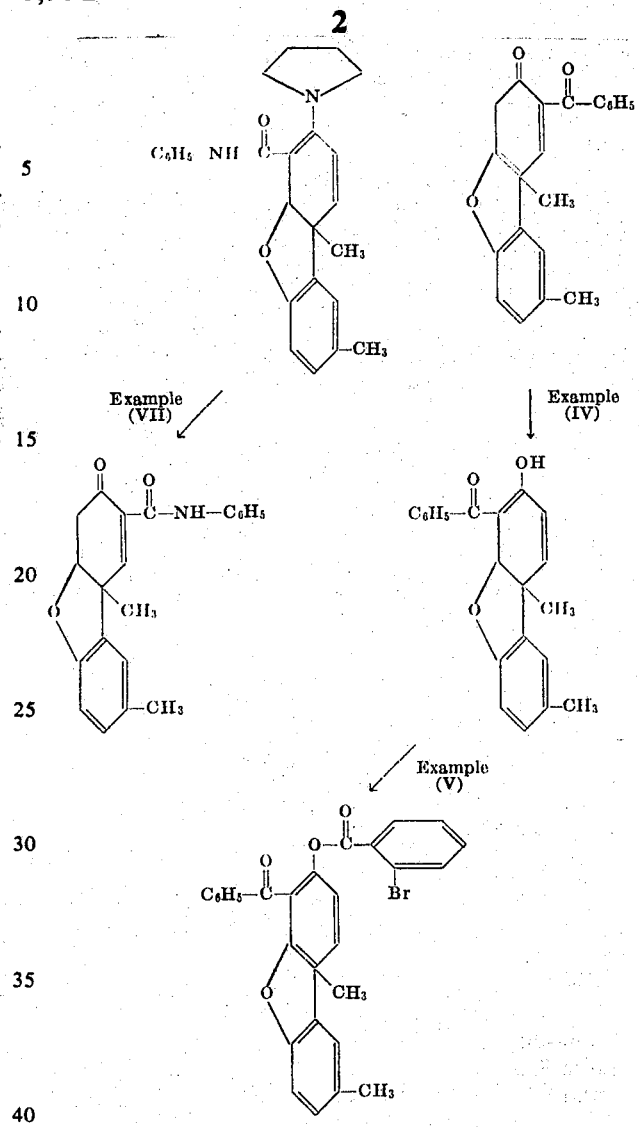

wherein each conversion is correlated with the corresponding specific example appended hereinafter.

Certain of the novel compounds of the present invention (when $R_2$ is o-bromobenzoyl and $R_3$ is anilino) are active analgetics when measured by the "writhing syndrome" test for analgetic activity as described by Siegmund et al., Proc. Soc. Exptl. Biol. Med., Vol. 9, p. 729 (1957), with modifications. The method is based upon the reduction of the number of writhes following the intraperitoneal injection of 1 mg./kg. of body weight of phenyl-p-quinone in male Swiss Albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less. In a representative operation, the compounds showed analgetic activity when tested by this procedure at the oral doses indicated in the following table:

| Compound | Oral dose mg./kg. of body weight |
|---|---|
| 4-benzoyl-4a,9b-dihydro-8,9b-dimethyl-3-dibenzofuranyl o-bromobenzoate | 200 |
| 3,4,4a,9a-tetrahydro-8,9b-dimethyl-3-oxo-2-dibenzofurancarboxanilide | 200 |

When mixed with suitable excipients or diluents, the above compounds can be prepared as pills, capsules, tablets, powders, solutions, suspensions, and the like for unit dosage and to simplify administration.

The invention will be described in greater detail in conjunction with the following specific examples.

EXAMPLE I

Preparation of 1-(4a,9b-dihydro-8,9b-dimethyl-3-dibenzofuranyl)-pyrrolidine

To a suspension of 2.00 g. of 4a9b-dihydro-8,9b-dimethyldibenzofuran-3(4H)-one in 50 ml. of methanol was added 3.4 ml. (2.9 g.) of pyrrolidine and the mixture was heated on a steam bath for 10 minutes. The resulting clear yellow solution was allowed to stand at room temperature for 1 hour. The solvents were removed by evaporation in vacuo to yield a yellow syrupy residue which was redissolved in benzene and evaporated to dryness in vacuo to yield 1-(4a,9b-dihydro-8,9b-dimethyl-3-dibenzofuranyl)pyrrolidine as a yellow syrup, $\lambda_{max}^{CHCL_3}$ 6.05 and 6.14 $\mu$.

EXAMPLE II

Preparation of 4a,9b-dihydro-8,9b-dimethyl-3-(1-pyrrolidinyl)-4-dibenzofuranyl phenyl ketone To a solution of 0.035 mole of 1-(4a,9b-dihydro-8,9b--dimethyl-3-dibenzofuranyl)pyrrolidine, prepared as in Example I, in 200 ml. of benzene was added 4.85 ml. (3.54 g.) of triethylamine and then 4.00 ml. (4.92 g.) of benzoyl chloride. The resulting solution gradually became deep red in color and a gelatinous precipitate separated. The mixture was allowed to stand at room temperature for 20 hours and then was filtered to remove 4.63 g. of triethylamine hydrochloride. Evaporation of the filtrate in vacuo yielded the crude product as a deep red syrup. One-half of this product was dissolved in benzene and chromatographed on 200 g. of neutral alumina (activity III). Elution with benzene and evaporation of the eluate yielded 3.27 g. of 4a,9b-dihydro-8,9b-dimethyl-3-(1-pyrrolidinyl)-4-dibenzofuranyl phenyl ketone as a deep red syrup, $\lambda_{max}^{CHCL_3}$ 6.10, 6.19, 6.30 and 6.40 $\mu$.

EXAMPLE III

Preparation of 2-benzoyl-4a,9b-dihydro-8,9b-dimethyldibenzofuran-3(4H)-one

To a solution of 0.816 g. of 4a,9b-dihydro-8,9b-dimethyl-3-(1-pyrrolidinyl)-4-dibenzofuranyl phenyl ketone in 20 ml. of methanol was added 20 ml. of 0.1N hydrochloric acid and then additional methanol was added to dissolve the precipitated oil. After being allowed to stand for ½ hours at room temperature the mixture was filtered to yield 0.515 g. of crude product as a tan solid, m.p. 150°–160°C. Recrystallization from absolute ethanol yielded 0.427 g. of 2-benzoyl-4a,9b-dihydro-8,9b-dimethyldibenzofuran-3(4H)-one as off-white needles m.p. 165°–168°C., $\lambda_{max}^{KBr}$ 5.95, 6.03, 6.11 and 6.24 $\mu$, $\lambda_{max}^{MeOH}$ 250 nm ($\epsilon$3,150), $\lambda_{max}^{0.1N\ NaOH}$ 350 nm ($\epsilon$1,860).

EXAMPLE IV

Preparation of 4a,9b-dihydro-3-hydroxy-8,9b-dimethyl-4-dibenzofuranyl phenyl ketone To a suspension of 0.156 g. of 2-benzoyl-4a,9b-dihydro-8,9b-dimethyldibenzofuran-3(4H)-one in methanol and concentrated ammonium hydroxide was added chloroform until the solid was dissolved. The resulting two phase mixture was vigorously stirred for 3 hours. The chloroform layer was separated, dried over magnesium sulfate and evaporated to dryness under reduced pressure. The residual yellow gum was triturated with ether and the resulting suspension was filtered to remove 0.021 g. of starting material. The filtrate was evaporated to dryness under reduced pressure to yield 0.110 g. of 4a,9b-dihydro-3-hydroxy-8,9b-dimethyl-4-dibenzofuranyl phenyl ketone as a yellow solid, $\lambda_{max}^{KBr}$ 5.90, 6.06, 6.28 and 6.34 $\lambda$.

EXAMPLE V

Preparation of 4-benzoyl-4a,9b-dihydro-8,9b-dimethyl-3-dibenzofuranyl o-bromobenzoate To a solution of 0.00157 mole of 4a,9b-dihydro-3-hydroxy-8,9b-dimethyl-4-dibenzofuranyl phenyl ketone in 10 ml. of pyridine was added 0.345 g. of o-bromobenzoyl chloride. After 18 hours at room temperature the solution was evaporated under reduced pressure and the semi-solid residue was taken up in ether. The filtered solution was evaporated to dryness under reduced pressure to yield a yellow gum which was dissolved in benzene and chromatographed on 10 g. of alumina (activity III). Evaporation of the benzene eluates and crystallization of the yellow residual gums gave 0.169 g. of 4-benzoyl-4a,9b-dihydro-8,9b-dimethyl-3-dibenzofuranyl o-bromobenzoate as colorless crystals, m.p. 118°–122°C., $\lambda_{max}^{KBr}$ 5.68, 6.02, 6.20 and 6.27 $\mu$.

EXAMPLE VI

Preparation of 4a,9b-dihydro-8,9b-dimethyl-3-(1-pyrrolidinyl)-4-dibenzofurancarboxanilide To 0.0221 mole of 1-(4a,9b-dihydro-8,9b-dimethyl-3-dibenzofuranyl)pyrrolidine, prepared as in Example I, in 100 ml. of dry benzene was added 2.4 ml. (2.64 g.) of phenyl isocyanate and the solution was allowed to stand at room temperature for 20 hours. The mixture was filtered to yield, after washing with benzene, 2.50 g. of 4a,9b-dihydro-8,9b-dimethyl-3-(1-pyrollidinyl)-4-dibenzofurancarboxanilide as a yellow solid, m.p. 170°–177°C., $\lambda_{max}^{KBr}$ 6.00, 6.10, 6.22 and 6.39 $\mu$.

EXAMPLE VII

Preparation of 3,4,4a,9a-tetrahydro-8,9b-dimethyl-3-oxo-2-dibenzofurancarboxanilide A suspension of 1.50 g. of 4a,9b-dihydro-8,9b-dimethyl-3-(1-pyrrolidinyl)-4-dibenzofurancarboxanilide in 100 ml. of methanol and 5 ml. of 1N hydrochloric acid was refluxed with stirring for 4 hours. The cooled solution was evaporated to dryness under reduced pressure to yield a gum as residue. Trituration with water yielded a solid which was collected by filtration and recrystallized from ethanol to yield 0.801 g. of 3,4,-4a,9a-tetrahydro-8,9b-dimethyl-3-oxo-2-dibenzofurancarboxanilide as colorless crystals, m.p. 195°–197°C., $\lambda_{max}^{KBr}$ 5.90 $\mu$.

We claim:
1. A compound of the formula:
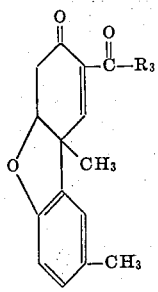
wherein $R_3$ is selected from the group consisting of phenyl and anilino.
2. The compound according to Claim 1 wherein $R_3$ is phenyl; 2-benzoyl-4a,9b-dihydro-8,9b-dimethyldibenzofuran-3(4H)-one.
3. The compound according to Claim 1 wherein $R_3$ is anilino; 3,4,4a,9a-tetrahydro-8,9b-dimethyl-3-oxo-2-dibenzofuran-carboxanilide.
* * * * *